United States Patent [19]

Mosca et al.

[11] Patent Number: 5,901,938
[45] Date of Patent: May 11, 1999

[54] STRUCTURE OF SUPPORT OF A FOCUSING HEAD OF A LASER BEAM OF A MACHINE

[75] Inventors: Claudio Mosca, Tenna; Massimo Felloni, Levico; Carmelo Agostini, Borgo Valsugana; Alberto Valli, Villazzano, all of Italy

[73] Assignee: Salvagnini Italia S.p.A., Sarego, Italy

[21] Appl. No.: 08/779,518

[22] Filed: Jan. 7, 1997

[30] Foreign Application Priority Data

Jan. 10, 1996 [IT] Italy .................................. MI96A0026

[51] Int. Cl.⁶ .................................................. F16M 13/00
[52] U.S. Cl. ......................... 248/661; 248/637; 248/657
[58] Field of Search ................................... 248/637, 646, 248/651, 656, 657, 913, 661; 74/425

[56] References Cited

U.S. PATENT DOCUMENTS

| | | | |
|---|---|---|---|
| 2,789,594 | 4/1957 | Coleman | 248/646 |
| 4,013,280 | 3/1977 | Chitayat et al. | 248/913 X |
| 5,004,890 | 4/1991 | Lim . | |
| 5,040,431 | 8/1991 | Sakino et al. | 248/913 X |
| 5,145,144 | 9/1992 | Resta et al. | 248/913 X |
| 5,251,501 | 10/1993 | Katahira | 248/657 X |
| 5,292,211 | 3/1994 | Takei | 248/657 X |

*Primary Examiner*—Derek J. Berger
*Attorney, Agent, or Firm*—Nixon & Vanderhye, P.C.

[57] ABSTRACT

A structure of support of a focusing head of a laser beam for a machine for working parts provided with a carriage capable of supporting the focusing head sliding in a vertical direction comprises a first girder capable of supporting the carriage sliding in the direction of a transversal axis and a second load bearing bridge-type girder, integral with two portals arranged along the short sides of a working plane. The first girder is supported by the second load bearing girder, sliding in the direction of a longitudinal axis like a yoke, by means of a sleeve formed in the first girder and slipped over the second load bearing girder.

6 Claims, 4 Drawing Sheets

STRUCTURE OF SUPPORT OF A FOCUSING HEAD OF A LASER BEAM OF A MACHINE

This application is based on application No. Ml96 A 000026 filed in Italy.

BACKGROUND

1. Field of the Invention

The present invention relates to a structure of support of a focusing head of a laser beam of a machine for working metal or non-metal parts.

2. Related Art and Other Considerations

Machines are known that use a laser beam for performing workings of metal parts, such as metal sheets, or non-metal parts. Typical workings are shearing, welding and the like. The laser beam is generated by a source of laser radiations and directed toward a focusing head along an optical path wherein there are elements of deviation of the beam, e.g., mirrors and a focusing lens.

In order to perform the workings, it is necessary to make a relative movement between the laser beam (emitted by the focusing head in a direction orthogonal to a surface of the part) and the part to be worked (resting on a substantially rectangular working plane). The relative movement can be obtained with the movement of the piece (fixed optics), with the combined movement of the laser beam in one direction and of the part in another direction (mixed optics) or, lastly, with the movement of the laser beam only (mobile optics).

In machines with mobile optics a first requirement is a high mechanical stability of the structures of support of the elements of deviation of the laser beam (mirrors) present along the optical path.

Thus, the embodiment most frequently adopted is the so-called portal one wherein a girder structure is slidably supported at the ends on two parallel pathways obtained in two portals situated on two long sides of the machine. In addition, a carriage, that houses the focusing head, is driven to move along the girder, in a direction orthogonal to the pathways, that is in a direction parallel to two short sides of the machine.

This solution has the disadvantage of limiting accessibility to the working plane along the long sides of the machine penalising in such a way the steps of adjustment, maintenance and operation.

Another known embodiment is the so-called cantilever one, wherein a structure with a projecting (cantilever) girder is mobile along just one pathway obtained in a shoulder situated along one long side of the machine. In this case again, the carriage, that houses the focusing head, is driven to move along the girder, in a direction orthogonal to the pathway of the girder. The cantilever embodiment improves accessibility to the working plane because it leaves free three sides of the machine. However, it does force a limitation of the dynamic performances of the movement of the cantilever girder and/or of the stroke of the carriage along the girder. Or, again, it forces the adoption of complex mechanical solutions in order to compensate for the deflections and torsions that the cantilever girder inevitably involves.

The object of the present invention is a structure of support of a focusing head of a laser beam that has a high structural stability, great accuracy in the movement and a high degree of accessibility to the working plane.

SUMMARY

The above-mentioned object is attained, according to the invention, with a structure of support of a focusing head of a laser beam of a machine for working parts provided with a carriage capable of supporting said focusing head sliding in a vertical direction with respect to a working plane, said structure of support comprised of a first girder capable of supporting said carriage sliding along an axis transversal with respect to said working plane and a pair of portals located on two opposite sides of said working plane. The characterized in that it comprises a second load bearing bridge-type girder, integral with said portals, capable of supporting said first girder like a yoke, sliding in the direction of a longitudinal axis with respect to said working plane. The first girder forms a sleeve slipped over said second load bearing girder so that the mass of said first girder is distributed in a balanced manner throughout said second load bearing girder and the deformations of said first girder determined by inertial loads are minimized.

According to a preferred embodiment, said portals are formed in the shape of an inverted "U" and they are arranged along the short sides of said working plane.

The structure of support according to the invention has a high rigidity that ensures a high degree of accuracy in the movement of the focusing head.

In addition, the presence of the two portals allows accessibility to a working plane on all four sides. If, for particular requirements of rigidity, it is necessary to further strengthen the structure, it is possible, for example, to make recourse to a brace that closes one long side of the working plane, with this leaving accessibility to it from three sides.

BRIEF DESCRIPTION OF THE DRAWINGS

Features and advantages of the invention will now be illustrated with reference to an embodiment represented as a non-limiting example in the enclosed figures, wherein.

DETAILED DESCRIPTION OF THE DRAWINGS

There is shown in FIGS. 1–4 a structure of support 1 of a focusing head of a laser beam, made according to the invention. The structure 1 belongs to a machine for working parts, particularly metal sheets, capable of performing shearing, welding and the like. The machine comprises a substantially rectangular working plane 4 on which the metal sheet to be worked is placed. The working plane 4 is provided with its own base, not shown, and it is placed within the structure 1. The focusing head of the laser beam, not shown, is slidably supported by a carriage 5 by guide means and actuators, also not shown, that drive it to translate in a vertical direction.

Figure 1:
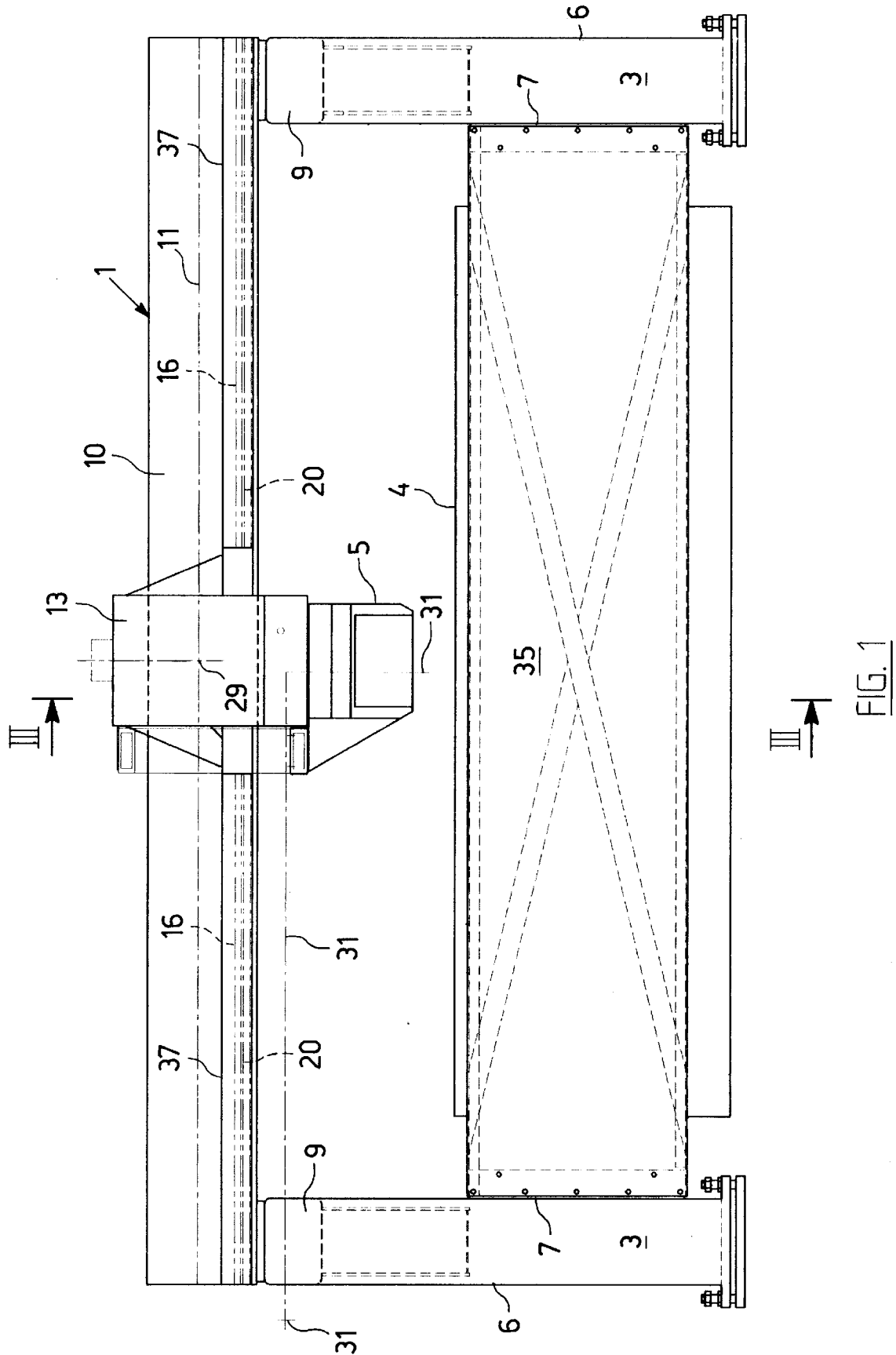
FIG. 1 is a front view of a structure of support of a focusing head of a laser beam made according to the invention.
Figure 2:
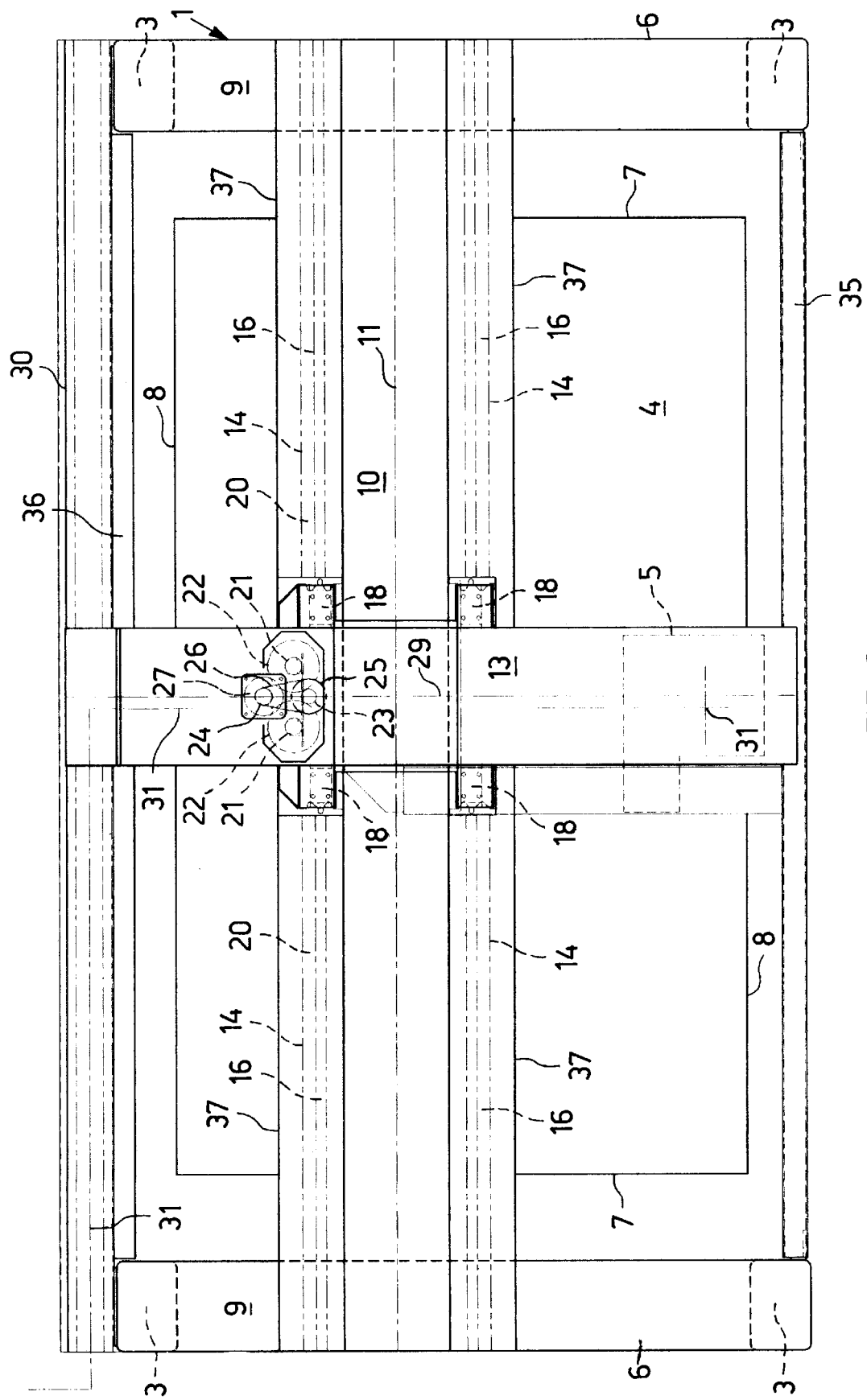
FIG. 2 is a view from above of the structure of support of FIG. 1.

The structure of support 1 comprises two portals 6 formed in the shape of an inverted "U", formed by uprights 3 and cross-girders 9, placed along transversal short sides 7 of the working plane 4. The portals 6 are connected by an bridge-type load bearing girder 10 having a longitudinal axis 11 parallel to the long sides 8 of the working plane 4 (FIG. 2). The load bearing girder 10 is made integral with the cross-girders 9 of the portals 6, in a position slightly misaligned with respect to a longitudinal axis of symmetry of the working plane 4. The portals 6 are also connected by means of a front brace 35 and a rear brace 36 arranged along longitudinal long sides 8 of the working plane 4. The braces 35 and 36 are formed by metal sheets reinforced by ribs and tubular elements.

Figure 3:
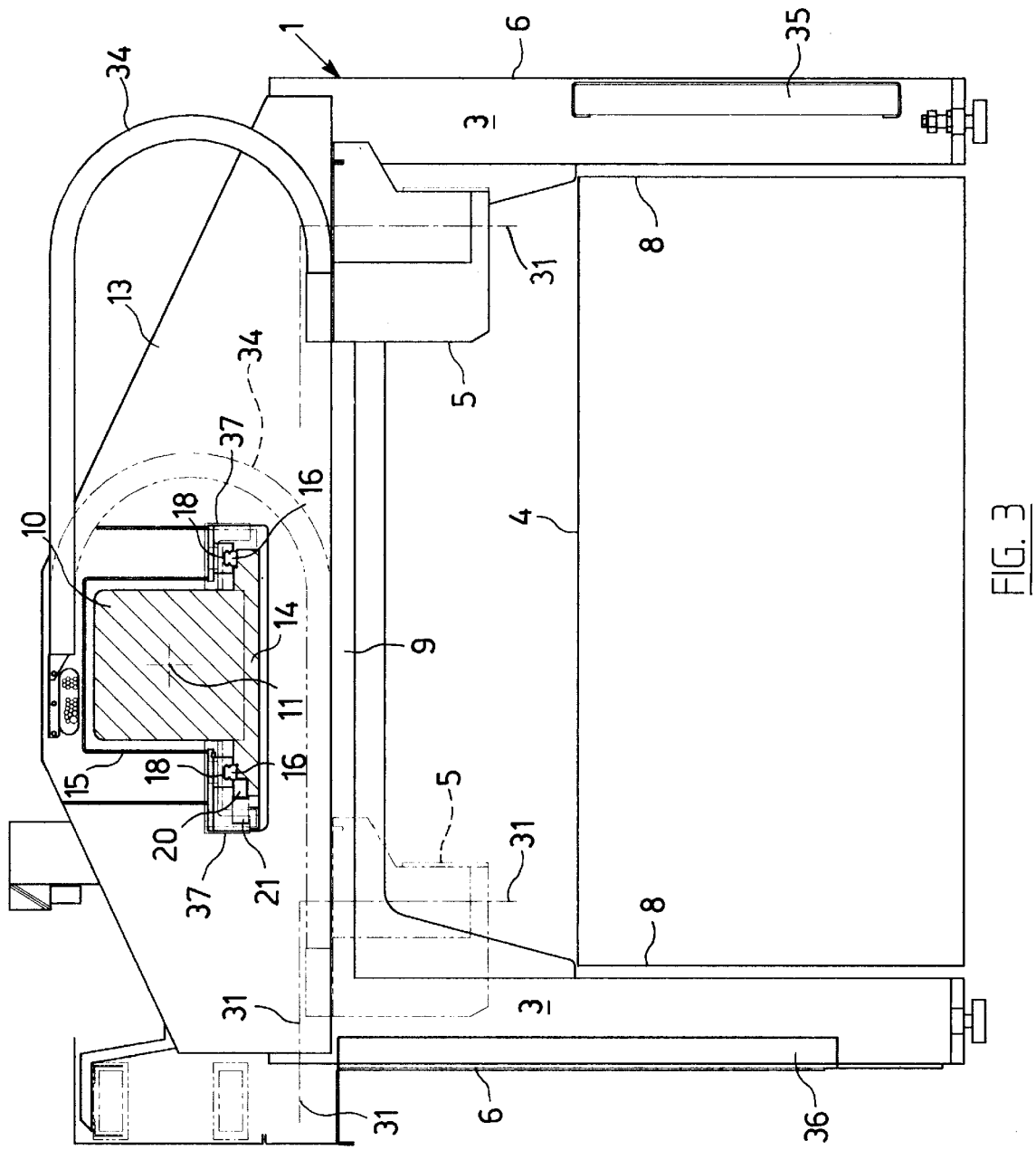
FIG. 3 is cross-sectional view taken along the plane III—III of FIG. 1.
Figure 4:
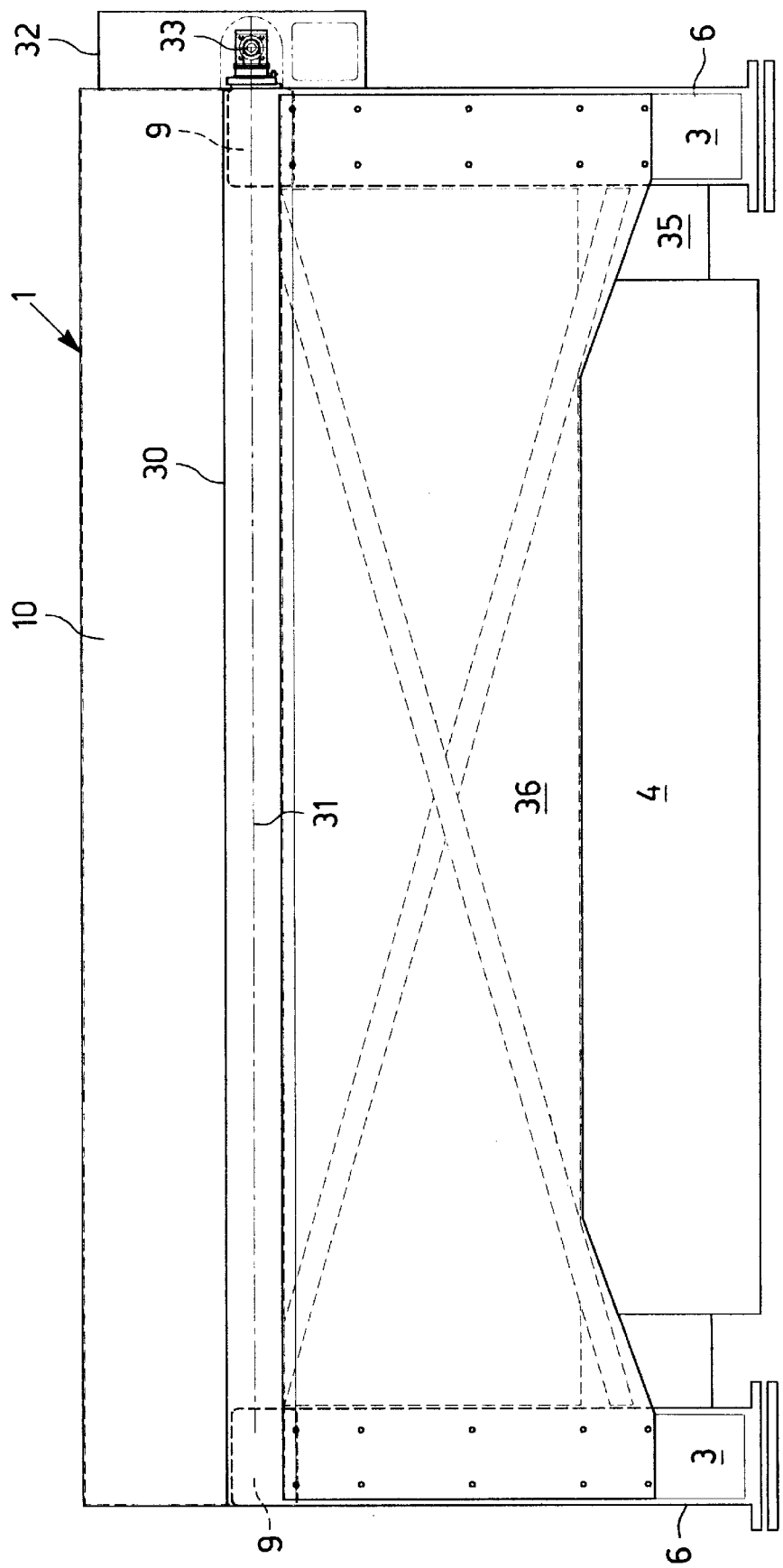
FIG. 4 is a rear view of the structure of support of FIG. 1.

A yoke-type girder 13 is slidably supported by the load bearing girder 10 by means of a sleeve 15 and a plate 14 (FIGS. 2 and 3). The sleeve 15 is formed in the yoke-type girder 13 and is slipped over the load bearing girder 10 and over the plate 14. The plate 14, that is integral with the girder 10 and extends in the direction of the longitudinal axis 11, supports two longitudinal linear guides 16 that constitute the pathways for four ball-circulation shoes 18, that guide the yoke-type girder 13 in its longitudinal sliding movements along the load bearing girder 10.

The yoke-type girder 13, by means of the sleeve 15, envelops the load bearing girder 10, so that the mass of its casing is distributed in a balanced manner over the girder 10 and the deformations of the yoke-type girder 13 determined by inertial loads are minimized.

The yoke-type girder 13 is driven to translate along the linear guides 16 by a transmission of motion comprising a helical-tooth rack 20, integral with the plate 14, which meshes with two helical-tooth pinions 21 rotatably supported by the girder 13. The pinions 21 receive the motion of rotation through respective helical-toothed wheels 22 coaxial with the pinions 21, that mesh with a central helical-tooth pinion 23 (FIG. 2). The pinion 23 is placed in rotation by an electric motor 27 through a reduction gear formed by toothed wheels 24 and 25 and by a belt 26.

The rack 20 can be replaced by a ball-circulation screw.

The linear guides 16 and the rack 20 are protected by bellows-type sheaths 37.

At least one of two pinions 21 that mesh with the rack 20 is axially preloaded by Belleville washers not shown. Such axial preload, given the inclination of the teeth of the rack, provides a counter-rotation of the pinions 21, that is a preload of the torque applied to the pinions such as to completely compensate for the clearance of the pinion-rack unit and all errors of alignment of the rack 20.

The carriage 5 supporting the focusing head is slidably supported in the yoke-type girder 13 by means of ball-circulation shoes and linear guides, not shown, coaxial with a transversal axis 29 of the girder 13. The carriage 5 is driven to translate in a transversal direction by an electric motor and by a transmission of motion comprising a ball-circulation screw, not shown. The transmission of motion to the focusing head could be made with a pinion-rack unit similar to that described earlier for the longitudinal translations of the yoke-type girder 13.

In the structure of support 1 there is mounted a bellows-type conduit 30 (FIG. 4) that guides toward the focusing head the laser beam, represented by a dash-and-dot line 31, emitted by a suitable source, not shown. The laser beam is directed by a mirror 33 in the bellows-type conduit 30 that by means of another mirror, not shown, guides it toward the focusing head.

An articulated sheath 34 houses, among other things, conductors for the supply of electrical energy to actuators and probes present in the focusing head.

By operating the respective motors and actuators, the yoke-type girder 13, the carriage 5 and the focusing head are driven to perform respective longitudinal translations along the load bearing girder 10, transversal translations along the yoke-type girder 13 and vertical translations with respect to the carriage 5. Through the combination of these three movements of translation it is possible to position with the highest accuracy the focusing head of the laser beam 31 with respect to the part to be worked, for example a metal sheet.

The load bearing girder 10 and the braces 35 and 36 ensure a particularly high rigidity of the structure of support 1, while retaining accessibility to the working plane 4 along three sides.

We claim:

1. A structure of support of a focusing head of a laser beam of a machine for working parts provided with a carriage capable of supporting said focusing head sliding in a vertical direction with respect to a working plane, said structure of support comprising a first girder capable of supporting said carriage, characterized in that the structure of support comprises portal-defining members spaced apart to define respective portals at opposite ends of the structure of support; a second load bearing bridge-type girder, integral with said portal-defining members, capable of supporting said first girder like a yoke, sliding in the direction of a longitudinal axis which extends between said portals, said first girder forming a sleeve slipped over said second load bearing girder so that the entire mass of said first girder is distributed and supported in a balanced manner solely by said second load bearing girder and the deformations of said first girder determined by inertial loads are minimized, said carriage sliding along a transverse axis which is transverse to the longitudinal axis.

2. A structure according to claim 1, characterized in that said portal-defining members have a shape of an inverted "U".

3. A structure according to claim 1, characterized in that said first girder is slidably supported by said second load bearing girder by means of said sleeve and linear guides supported by a plate that is integral with said second girder and extends in the direction of said longitudinal axis, shoes integral with said first girder being in engagement with said linear guides.

4. A structure according to claim 3, further comprising:

two helical-tooth pinions rotatably supported by the first girder;

a helical-tooth rack, integral with said plate, with which the two helical-tooth pinions mesh;

two helical-toothed wheels respectively coaxial with the two pinions;

a central helical-tooth pinion with which the two helical-toothed wheels mesh;

a drive system for rotating the helical-tooth pinion and thereby translating the first girder along the linear guides.

5. A structure according to claim 4, wherein the drive system comprises a motor and a reduction gear, the reduction gear including toothed reduction gear wheels and a belt.

6. A structure according to claim 5, wherein a first of the toothed reduction gear wheels is coaxial with the motor and a second of the toothed reduction gear wheels is coaxial with the central helical-tooth pinion.

* * * * *